United States Patent
Lin et al.

(10) Patent No.: US 11,439,286 B2
(45) Date of Patent: Sep. 13, 2022

(54) MOBILE ROBOT AND METHOD OF CONTROLLING MOBILE ROBOT

(71) Applicant: Panasonic Intellectual Property Management Co., Ltd., Osaka (JP)

(72) Inventors: Jie Lin, Osaka (JP); Teruto Hirota, Tokyo (JP); Takayuki Nagata, Osaka (JP); Yuki Takaoka, Tokyo (JP); Tatsuhiro Kishi, Tokyo (JP); Pinchu Yang, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 301 days.

(21) Appl. No.: 16/671,772

(22) Filed: Nov. 1, 2019

(65) Prior Publication Data

US 2020/0060491 A1 Feb. 27, 2020

Related U.S. Application Data

(63) Continuation of application No. PCT/JP2018/038916, filed on Oct. 19, 2018.

(30) Foreign Application Priority Data

Nov. 10, 2017 (JP) .............................. JP2017-216922

(51) Int. Cl.
*A47L 9/28* (2006.01)
*B25J 9/00* (2006.01)
*G05D 1/00* (2006.01)

(52) U.S. Cl.
CPC ........... *A47L 9/2805* (2013.01); *B25J 9/0003* (2013.01); *G05D 1/0088* (2013.01); *A47L 2201/04* (2013.01)

(58) Field of Classification Search
CPC .. A47L 9/2808; A47L 2201/04; B25J 9/0003; G05D 1/0088; G05D 1/0225;
(Continued)

(56) References Cited

U.S. PATENT DOCUMENTS

2013/0092190 A1* 4/2013 Yoon .................... G05D 1/0242
15/21.1
2013/0098401 A1* 4/2013 Yoon ................... A47L 11/4055
15/21.1

(Continued)

FOREIGN PATENT DOCUMENTS

JP   H0619545 A  *  1/1994
JP   2004-275304      10/2004

(Continued)

OTHER PUBLICATIONS

English Translation of JPH0619545A, obtained from Espacenet, Accessed Mar. 14, 2022.*

(Continued)

*Primary Examiner* — Jeff A Burke
*Assistant Examiner* — Blake A Wood
(74) *Attorney, Agent, or Firm* — Wenderoth, Lind & Ponack, L.L.P.

(57) ABSTRACT

A mobile robot that autonomously travels includes a body that has a front surface, a driver that is disposed in the body and that drives travelling of the body, a base that includes a spring and that is connected to the body via the spring, and a distance measurer that is disposed at an upper part of the base. The base is connected to the body in such a way that the base is movable to be in a first state in which the laser range finder is located inside the body and a second state in which the laser range finder is located outside the body. The spring generates a force that pushes the base from a front surface of the body to an outside of the body.

10 Claims, 10 Drawing Sheets

(58) Field of Classification Search
CPC ............ G05D 1/024; G05D 2201/0215; A71L 9/2805; A71L 2201/04; A71L 9/2852; A71L 9/28; A71L 2201/0022
See application file for complete search history.

(56) References Cited

U.S. PATENT DOCUMENTS

| | | | |
|---|---|---|---|
| 2014/0257564 A1* | 9/2014 | Sun ...................... | B25J 9/0003 |
| | | | 700/259 |
| 2016/0316982 A1 | 11/2016 | Kim et al. | |
| 2016/0334804 A1* | 11/2016 | Webber ............... | A01B 69/007 |
| 2017/0100007 A1 | 4/2017 | Matsumoto et al. | |

FOREIGN PATENT DOCUMENTS

| | | |
|---|---|---|
| JP | 2014-188001 | 10/2014 |
| JP | 2015-225507 | 12/2015 |
| JP | 2017-500951 | 1/2017 |
| JP | 2017-029249 | 2/2017 |
| JP | 2017-200592 | 11/2017 |
| WO | 2016/002186 | 1/2016 |

OTHER PUBLICATIONS

International Search Report of PCT application No. PCT/JP2018/038916 dated Dec. 25, 2018.

\* cited by examiner

MOBILE ROBOT AND METHOD OF CONTROLLING MOBILE ROBOT

BACKGROUND

1. Technical Field

The present disclosure relates to a mobile robot and a method of controlling a mobile robot.

2. Description of the Related Art

To date, an autonomous mobile robot that autonomously travels along a cleaning surface and sucks up dust on the cleaning surface has been disclosed (see International Publication No. 2016/002186).

SUMMARY

However, the existing autonomous mobile robot has room for improvement regarding setting of a travel path.

One non-limiting and exemplary embodiment provides a mobile robot that can travel along a more appropriate travel path.

In one general aspect, the techniques disclosed here feature a mobile robot that autonomously travels, the mobile robot including a body that has a front surface, a driver that is disposed in the body and that drives travelling of the body, a base that includes a spring and that is connected to the body via the spring, and a laser range finder that is disposed at an upper part of the base. The base is connected to the body in such a way that the base is movable to be in a first state in which the laser range finder is located inside the body and a second state in which the laser range finder is located outside the body. The spring generates a force that pushes the base from a front surface of the body to an outside of the body.

It should be noted that general or specific embodiments may be implemented as a system, a method, an integrated circuit, a computer program, a computer-readable storage medium, or any selective combination thereof. Examples of the computer-readable recording medium include a non-volatile recording medium, such as a compact disc read-only memory (CD-ROM).

A mobile robot according to the present disclosure can travel along a more appropriate travel path.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
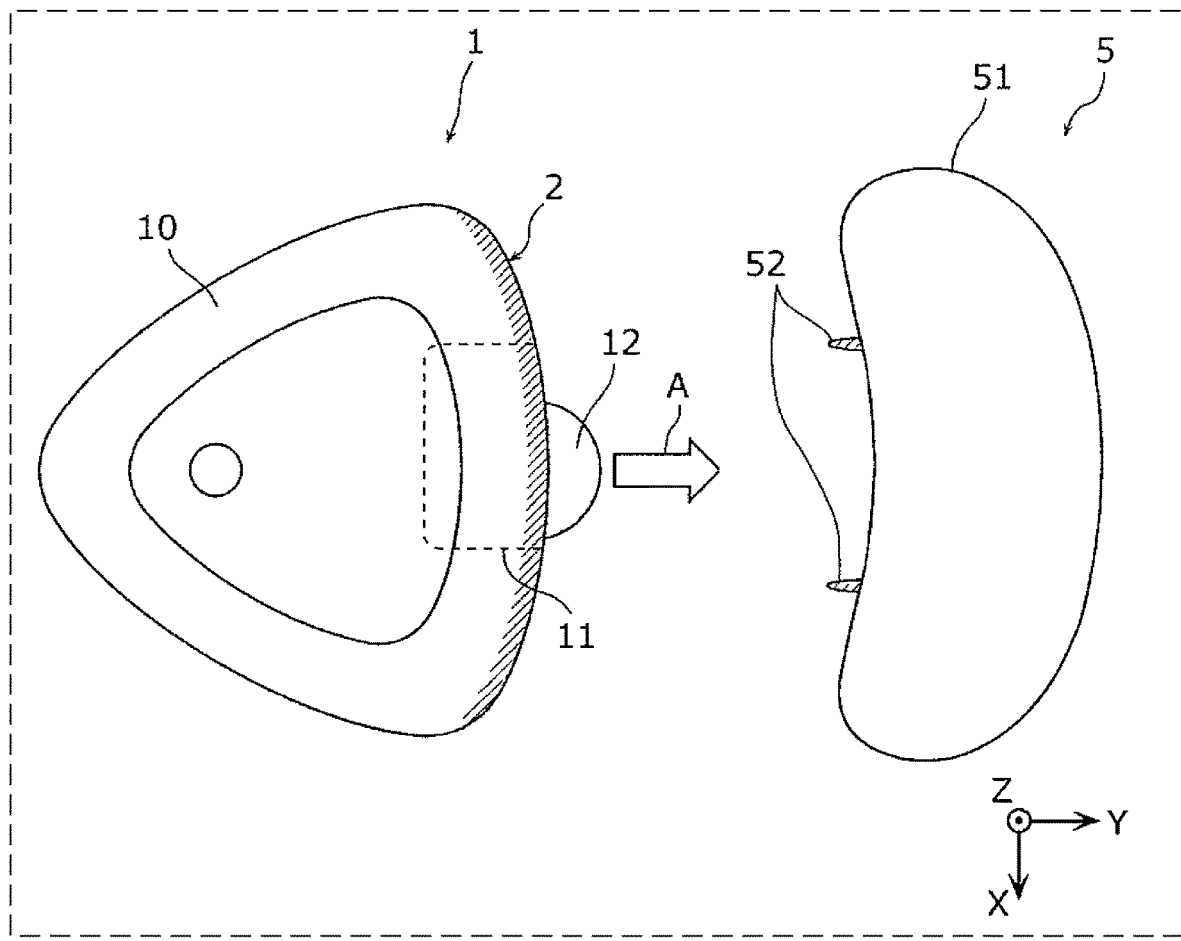
FIG. 1 is a schematic external top view of a cleaner and a charger according to an embodiment.

Underlying Knowledge Forming Basis of the Present Disclosure

The inventors found that the existing autonomous mobile robot described in "BACKGROUND" has the following problem.

The existing autonomous mobile robot sets a travel path by using an ultrasonic sensor or an infrared light sensor. On the other hand, there is a technology, which is called "simultaneous localization and mapping (SLAM)", that enables a moving body to simultaneously estimate its position and make a map by emitting and receiving light.

An autonomous mobile robot that uses the SLAM technology has a problem in that, if a laser range finder for emitting and receiving light becomes soiled or damaged, the SLAM technology may malfunction and, as a result, a travel path may not be accurately set.

To solve the problem, a mobile robot according to an aspect of the present disclosure is a mobile robot that autonomously travels, the mobile robot including a body that has a front surface, a driver that is disposed in the body and that drives travelling of the body, a base that includes a spring and that is connected to the body via the spring, and a laser range finder that is disposed at an upper part of the base. The base is connected to the body in such a way that the base is movable to be in a first state in which the laser range finder is located inside the body and a second state in which the laser range finder is located outside the body. The spring generates a force that pushes the base from a front surface of the body to an outside of the body.

With the above aspect, the mobile robot can obtain the distance to a nearby object by using the laser range finder that is disposed on the base that is pushed out from the front surface of the body by the spring in the second state. Because the laser range finder is pushed out from the front surface of the body, the mobile robot can obtain not only the distance to an object that is present in the forward direction but also the distance to an object that is present in a wider area in the left-right direction. Then, the mobile robot can determine a more appropriate travel path by using the distance to a nearby object that is obtained in this way. Because the laser range finder is located inside the body in the first state, when the mobile robot does not obtain the distance to a nearby object, it is possible to reduce the probability that the laser range finder becomes soiled or damaged due to, for example, contact with a nearby object. As a result, when the mobile robot enters the second state the next time, the mobile robot can more appropriately obtain the distance to a nearby object. Moreover, because the mobile robot has the laser range finder at the front surface, it is possible to avoid increase in the height of the mobile robot and to reduce difficulty in traveling under a piece of furniture such as a sofa, which may occur if the laser range finder is disposed at the upper surface. Thus, the mobile robot can travel along a more appropriate travel path.

For example, the base may enter the first state when an external object contacts the base or the laser range finder, and the base may enter the second state when the external object is not in contact with the base or the laser range finder.

With the above aspect, the base of the mobile robot enters the first state or the second state depending on whether an external object contacts the base. Thus, the mobile robot can change the state of the base on the basis of more specific structure, and, as a result, the mobile robot can travel along a more appropriate travel path.

For example, the mobile robot may further include a power source control circuit and a power source, the external object may be a charger, and the power source control circuit may charge the power source by using the charger when the base is in the first state.

With the above aspect, the base of the mobile robot enters the first state when the base contacts the charger, which is an example of an external object, and is charged. Thus, the mobile robot can reduce the probability that the laser range finder becomes soiled or damaged due to, for example, contact with the charger when the mobile robot is being charged.

For example, the mobile robot may further include a control circuit; and the laser range finder may include a turntable, a light emitter disposed on the turntable, a light receiver disposed on the turntable, a first side surface that is disposed on the turntable so as to surround the light emitter and the light receiver, and a second side surface that is disposed on the turntable so as to surround the light emitter and the light receiver. The light emitter emits light to an outside of the laser range finder via the first side surface. The light receiver receives light that enters the light receiver from the outside of the laser range finder via the first side surface. The control circuit stops rotation of the turntable in the first state, and rotates the turntable in the second state.

With the above aspect, the mobile robot stops the rotation of the laser range finder in the first state. Thus, when the mobile robot does not obtain the distance to a nearby object, it is possible to further reduce the probability that the laser range finder becomes soiled or damaged due to, for example, contact with a nearby object.

For example, the body may have an opening in the front surface; the laser range finder may further include a sensor that detects a rotation angle of the turntable; and the control circuit may (a) obtain the rotation angle of the turntable from the sensor in the first state, and (b) stop the rotation of the turntable at a position where the second side surface is visible from the opening.

With the above aspect, the mobile robot stops the rotation of the turntable in an orientation such that a surface of the laser range finder that is not used to emit light faces the opening in the front surface. Thus, when the mobile robot does not obtain the distance to a nearby object, it is possible to further reduce the probability that a surface of the laser range finder that is used to emit light becomes soiled or damaged due to, for example, contact with a nearby object.

A method of controlling a mobile robot according to an aspect of the present disclosure is a method of controlling a mobile robot that autonomously travels, the mobile robot including a body that has a front surface, a driver that is disposed in the body and that drives travelling of the body, a base that includes a spring and that is connected to the body via the spring, a laser range finder that is disposed at an upper part of the base, and a control circuit. The spring generates a force that pushes the base from a front surface of the body to an outside of the body. The method includes causing the base to be in a first state in which the laser range finder is located inside the body, and causing the base to be in a second state in which the laser range finder is located outside the body.

Thus, the method provides advantageous effects that are similar to those of the mobile robot described above.

It should be noted that general or specific embodiments may be implemented as a system, a method, an integrated circuit, a computer program, a computer-readable storage medium, or any selective combination thereof.

Hereafter, embodiments will be described in detail with reference to the drawings.

The embodiments described below are each used to describe a general or specific example. Values, shapes, materials, elements, the positions of elements, the connections between elements, steps, and the order of steps are only exemplary, and do not limit the scope of the present disclosure. Elements in the following embodiments that are not described in the broadest independent claim are optional.

Embodiments

In the present embodiment, a cleaner 1, which is a mobile robot that can travel along a more appropriate travel path, will be described.

Figure 2:
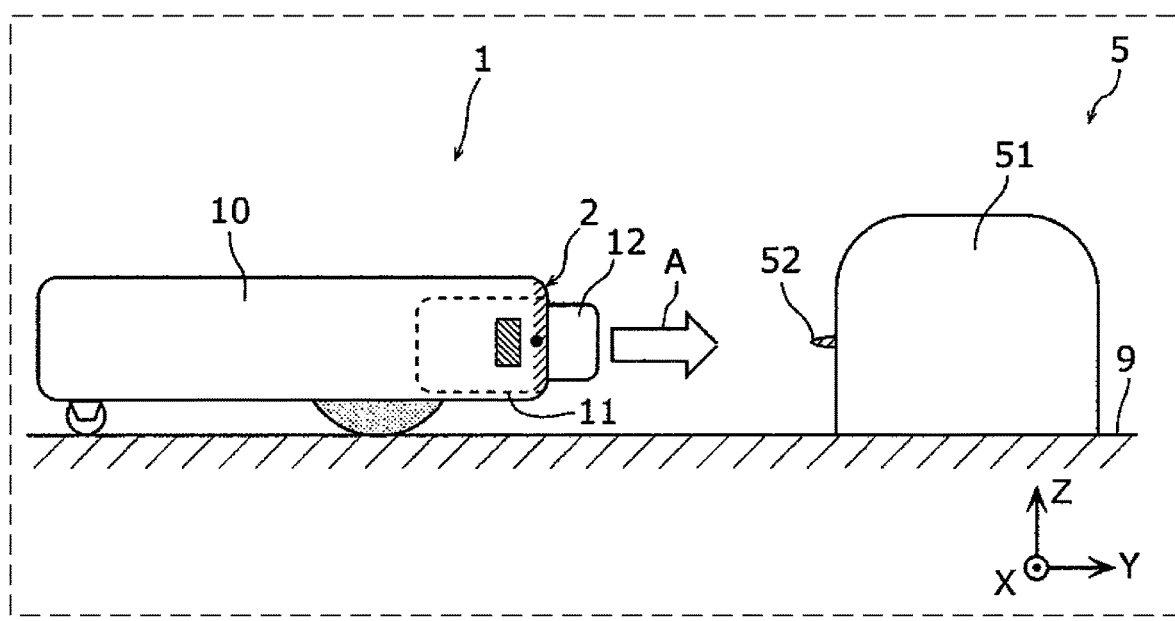
FIG. 2 is a schematic external side view of the cleaner and the charger according to the embodiment.
Figure 3:
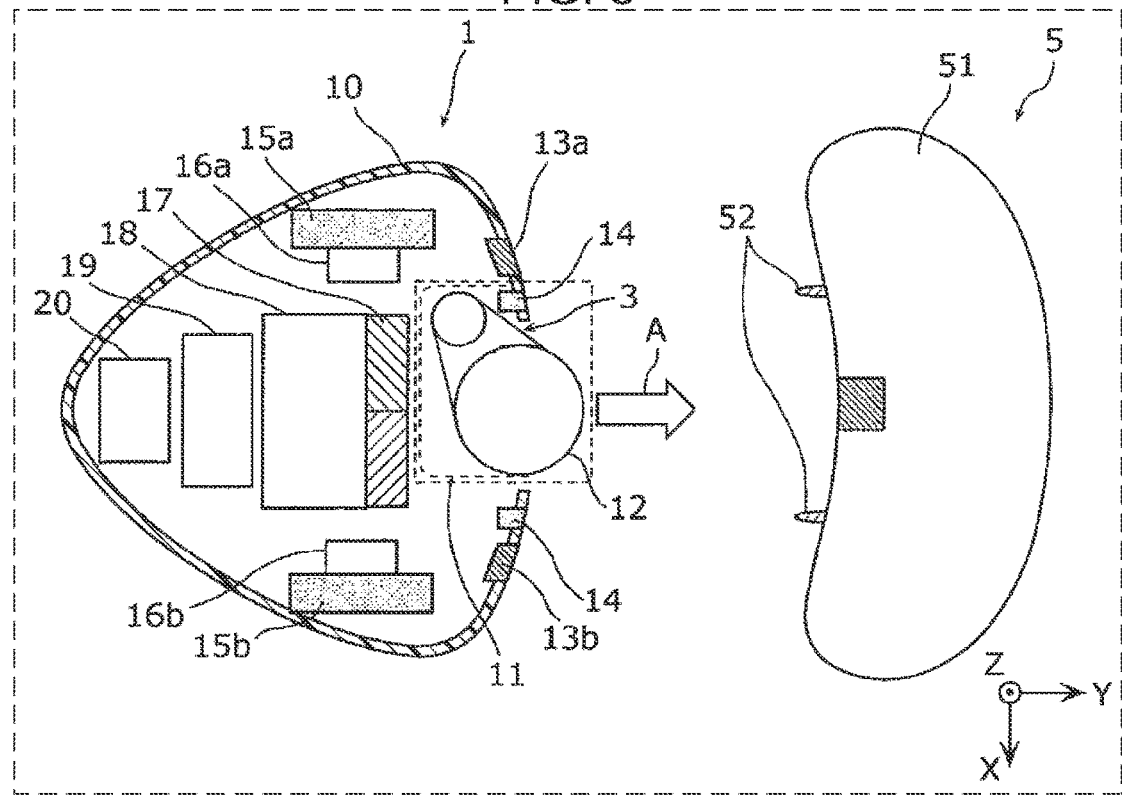
FIG. 3 is a schematic top view illustrating the internal structures of the cleaner and the charger according to the embodiment when a distance measurer is in a normal state.
Figure 4:
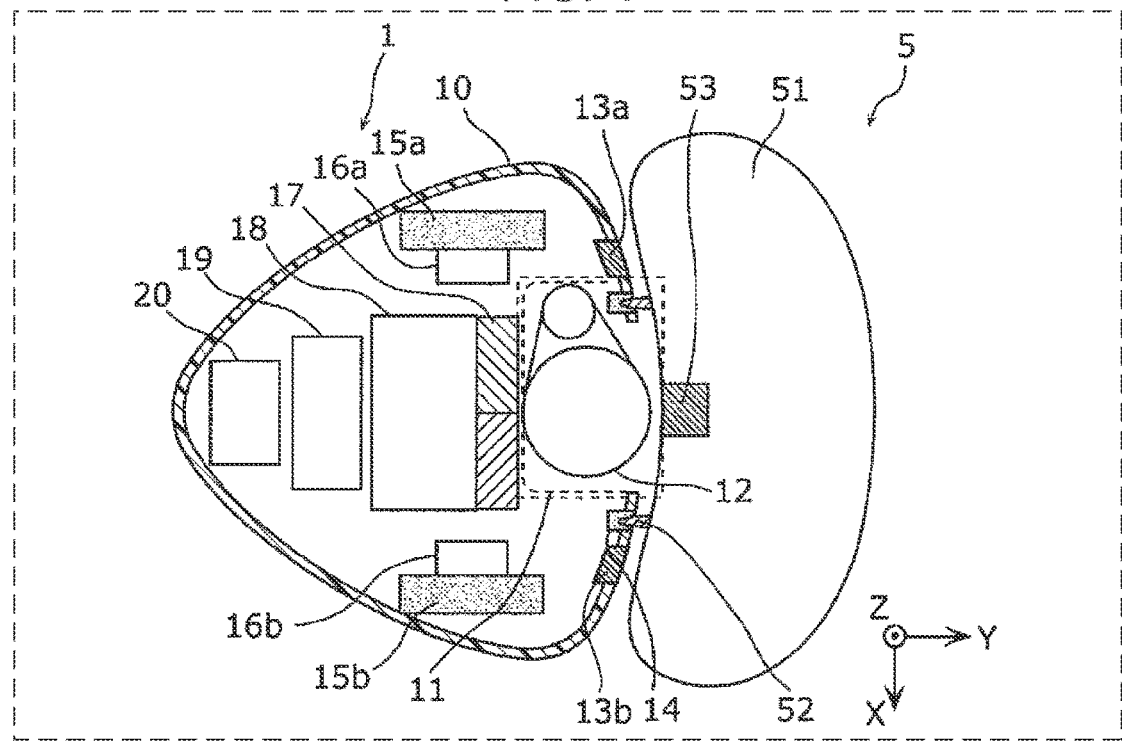
FIG. 4 is a schematic top view illustrating the internal structures of the cleaner and the charger according to the embodiment when the distance measurer is in a retracted state.
Figure 5:
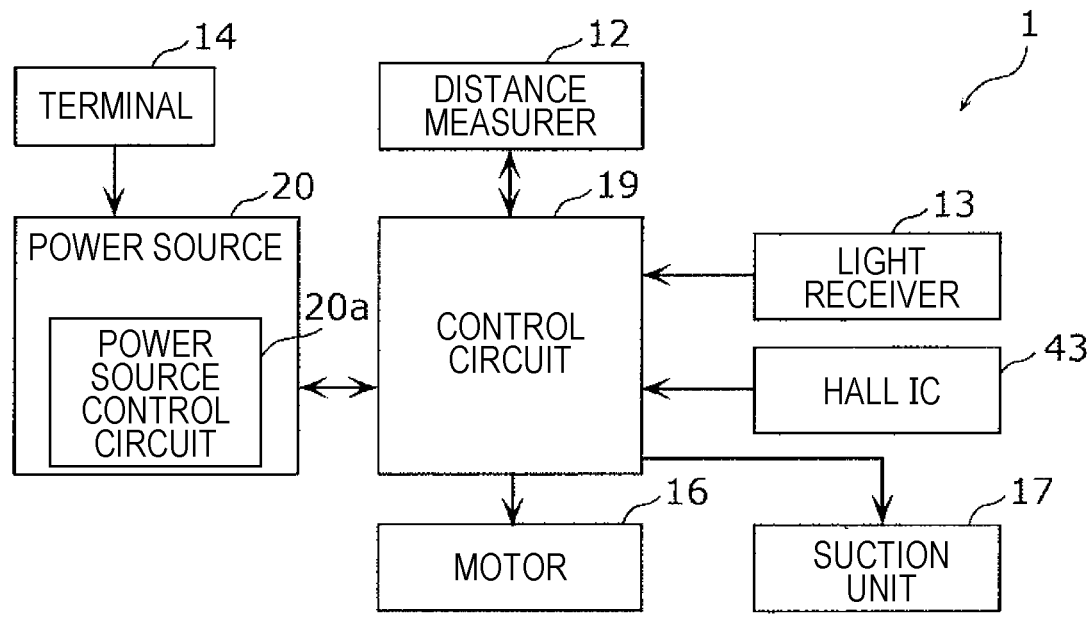
FIG. 5 is a block diagram illustrating the functional blocks of the cleaner according to the embodiment.

FIGS. 1 and 2 are respectively a schematic external top view and a schematic external side view of the cleaner 1 and a charger 5 according to the present embodiment. FIGS. 3 and 4 are schematic external top views illustrating the internal structure of the cleaner 1 and the charger 5 according to the present embodiment respectively when a distance measurer 12 is in a normal state and when the distance measurer 12 is in a retracted state. FIG. 5 is a block diagram illustrating the functional blocks of the cleaner 1 according to the present embodiment. Referring to these figures, the operation of the cleaner 1 will be described. In the following description, the XYZ coordinates illustrated in the figures may be used. The positive-Z-axis direction may be referred as "upward direction".

The cleaner 1 autonomously travels along a cleaning surface 9 and cleans the cleaning surface 9. The cleaner 1 autonomously determines a travel path thereof, and sucks up dust and the like on the cleaning surface 9 while moving along the determined travel path. A space having the cleaning surface 9 as the bottom surface thereof may be referred to as "cleaning space". The cleaner 1 autonomously recognizes the position of the charger 5, travels toward the charger 5, becomes electrically connected to the charger 5, and is charged by the charger 5. Travelling of the cleaner 1 toward the charger 5 may be referred to as "returning". When the cleaner 1 performs cleaning and returning, the cleaner 1 basically travels in the direction indicated by an arrow A. Regarding the cleaner 1, the direction of the arrow A may be referred to as "forward direction". In order to determine a travel path for cleaning, the cleaner 1 estimates the position thereof and makes a map by using the SLAM technology.

The charger 5 charges the cleaner 1. The charger 5 is immovably set at a predetermined position on the cleaning surface 9. The charger 5 receives electric power from an external system power source or the like, and charges the cleaner 1 by supplying the electric power to the cleaner 1.

As illustrated in FIGS. 1 to 5, the cleaner 1 includes a body 10 and the distance measurer 12. The body 10 includes light receivers 13a and 13b, terminals 14, wheels 15a and 15b, motors 16a and 16b, a suction unit 17, a dust box 18, a control circuit 19, and a power source 20. The light receivers 13a and 13b may be referred as "light receiver 13", the wheels 15a and 15b may be referred as "wheel 15", and the motors 16a and 16b may be referred as "motor 16". The wheel 15 and the motor 16 may be referred as "driver". The driver includes a known drive mechanism, in addition to the wheel 15 and the motor 16. An example of the known drive mechanism is a shaft that is fixed to the wheel 15. For example, as the motor 16 rotates, rotational power is applied to the wheel 15 via the shaft. Thus, the cleaner 1 can be driven. The motor 16 can also change the angle of the wheel 15. Thus, the direction of movement of the cleaner 1 can be changed.

The body 10 is a housing of the cleaner 1. The body 10 defines the outline of the cleaner 1. In a top view, the body 10 has a substantially triangular shape. However, the body 10 may have any shape, such as a circular shape, a quadrangular shape, or a pentagonal shape. For example, the dimensions of the body 10 are about 30 cm in each of the X-axis direction and the Y-axis direction and about 10 cm in the Z-axis direction. However, the dimensions of the body 10 are not limited to these. A front surface 2 is one of the outer surfaces of the body 10 that faces in the travelling direction indicated by the arrow A. The front surface 2 has an opening 3. The housing of the body 10 is made of a resin or the like. The body 10 has a space 11 that contains the distance measurer 12. In other words, the body 10 has the space 11 therein.

The distance measurer 12 measures the distance between an object near the cleaner 1 and the distance measurer 12. The distance measurer 12 may be, for example, a laser range finder or a light detection and ranging (LiDAR) device, each of which measures the distance to a nearby object by using light. The distance measurer 12 is disposed in the space 11.

The distance measurer 12 is disposed so as to be exposed from the opening 3 of the front surface 2 of the body 10. The distance measurer 12 includes a light emitter and a light receiver that are disposed in an upper part thereof. The distance measurer 12 measures the distance from the distance measurer 12 to an external object by measuring the period from the time when the light emitter emits light to the time when the light receiver receives the light. The light emitter and the light receiver of the distance measurer 12 will be described below in detail.

The light receivers 13a and 13b are sensors that receive infrared light from a light emitter 53 of the charger 5. The light receiver 13a is disposed at a predetermined position on the front surface 2 of the body 10 that is on the left side with respect to the left-right center when seen in the travelling direction so as to be exposed to the outside. The light receiver 13b is disposed at a predetermined position on the front surface 2 of the body 10 that is on the right side with respect to the left-right center when seen in the travelling direction so as to be exposed to the outside. In response to reception of infrared light, the light receivers 13a and 13b supply information representing the intensity of the received infrared light to the control circuit 19. The information representing the intensity of infrared light includes not only the intensity value of infrared light but also information as to whether infrared light has been received or not. The information as to whether infrared light has been received or not include: "light received" in a case where infrared light having an intensity of a predetermined threshold or higher is received; and "no light received" in a case where infrared light having an intensity lower than a predetermined threshold is received. The light receivers 13a and 13b are used to obtain the direction or the position of the charger 5 relative to the cleaner 1 when the cleaner 1 returns to the charger 5.

The terminals 14 are electrically connected to terminals 52 of the charger 5, and receive electric power from the charger 5.

The wheels 15a and 15b enable the cleaner 1 to move. The wheels 15a and 15b are fixed to the body 10, and, as the wheels 15a and 15b rotate, the body 10 moves. The wheel 15a is disposed at a predetermined position on the bottom surface of the body 10 that is on the left side relative to the left-right center when seen in the travelling direction. The wheel 15b is disposed at a predetermined position on the bottom surface of the body 10 that is on the right side relative to the left-right center when seen in the travelling direction. Rotations of the wheels 15a and 15b are respectively and independently controlled by the motors 16a and 16b. The material of the wheels 15a and 15b is rubber, nylon, or the like.

The motors 16a and 16b respectively control the rotations of the wheels 15a and 15b. The motor 16a rotates or stops rotating the wheel 15a under the control by the control circuit 19. The motor 16b rotates or stops rotating the wheel 15b under the control by the control circuit 19.

The suction unit 17 sucks up dust on the cleaning surface 9. The suction unit 17 sucks up the dust together with air through a suction hole (not shown) disposed in the bottom surface of the body 10. The suction unit 17 also discharges the dust to the dust box 18. The sucking operation of the suction unit 17 is controlled by the control circuit 19.

The dust box 18 provides a space for storing dust that the suction unit 17 has sucked up together with air and that has been separated from the air through a filter.

The control circuit 19 is a control device that activates various functions of the cleaner 1 and controls the cleaner 1 to perform a cleaning process and a returning process. The control circuit 19 may be realized by a processor that executes programs.

During the cleaning process, the control circuit 19 causes the cleaner 1 to travel by: measuring the distance to an object near the cleaner 1 by using the distance measurer 12; determining a travel path of the cleaner 1 by using the SLAM technology; and controlling the motors 16a and 16b. During the returning process, the control circuit 19 obtains the position of the charger 5 by using the light receivers 13a and 13b, and causes the cleaner 1 to travel toward the charger 5. The control circuit 19 controls the distance measurer 12, to be more specific, the rotation of a turntable 38 shown in FIG. 6.

The power source 20 supplies electric power to the components of the cleaner 1. The power source 20 includes a secondary battery that is the main part of the power source 20, in other words, a rechargeable battery; and a power source control circuit 20a that controls charging and discharging of the main part of the power source 20. Charging of the main part of the power source 20 may be simply referred to as "charging the power source 20".

The power source control circuit 20a performs control whether to charge the power source 20 or to discharge the power source 20 under the control by the control circuit 19.

To be more specific, the power source control circuit 20a charges the power source 20 by using the charger 5 when a base 31 is in the retracted state. The secondary battery, which is the main part of the power source 20, is, for example, a lithium-ion battery.

As illustrated in FIGS. 1 to 5, the charger 5 includes a housing 51, the terminals 52, and the light emitter 53.

The housing 51 defines the outline of the charger 5. A surface of the housing 51 that faces the front surface 2 of the cleaner 1 in a charged state may have a shape corresponding to the front surface 2. The material of the housing 51 is a resin or the like.

The terminals 52 are electrically connected to the terminals 14 of the cleaner 1, and supply electric power to the cleaner 1. Electric power that the charger 5 received from the outside is supplied to the terminals 52, and the electric power is supplied to the terminals 14 of the cleaner 1 through the terminals 52.

The light emitter 53 is a light source that emits infrared light, such as a light-emitting diode. The light emitter 53 repeatedly emits light and stops emitting light in a predetermined light emission pattern. Infrared light emitted by the light emitter 53 is received by the light receivers 13a and 13b of the cleaner 1, and is used as a marker of the position of the charger 5 when the cleaner 1 travels toward the charger 5. Instead of infrared light, the light emitter 53 may emit visible light, ultraviolet light, or the like.

Figure 6:
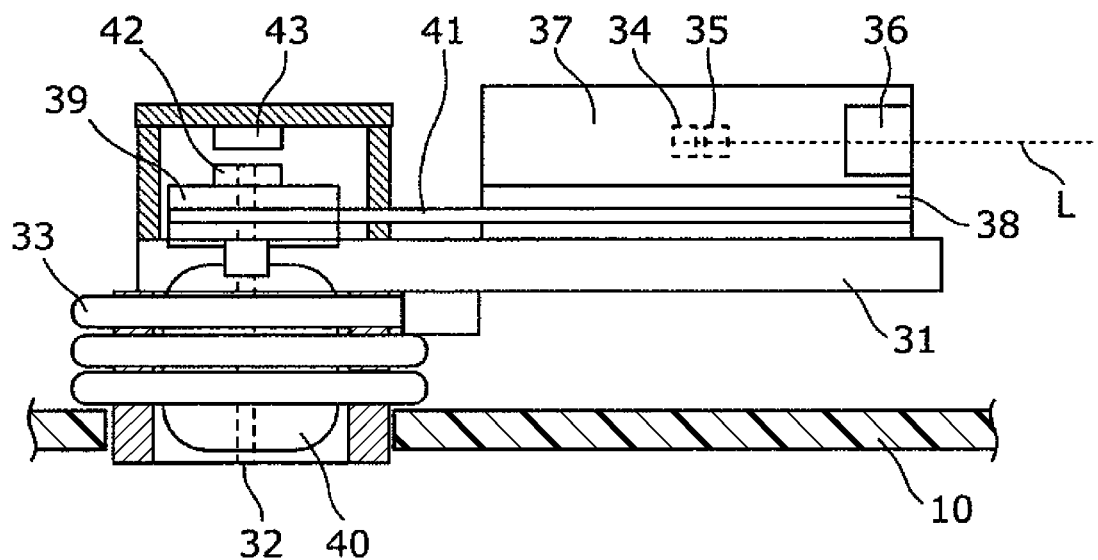
FIG. 6 is a schematic side view illustrating the structure of the distance measurer according to the embodiment.
Figure 7:
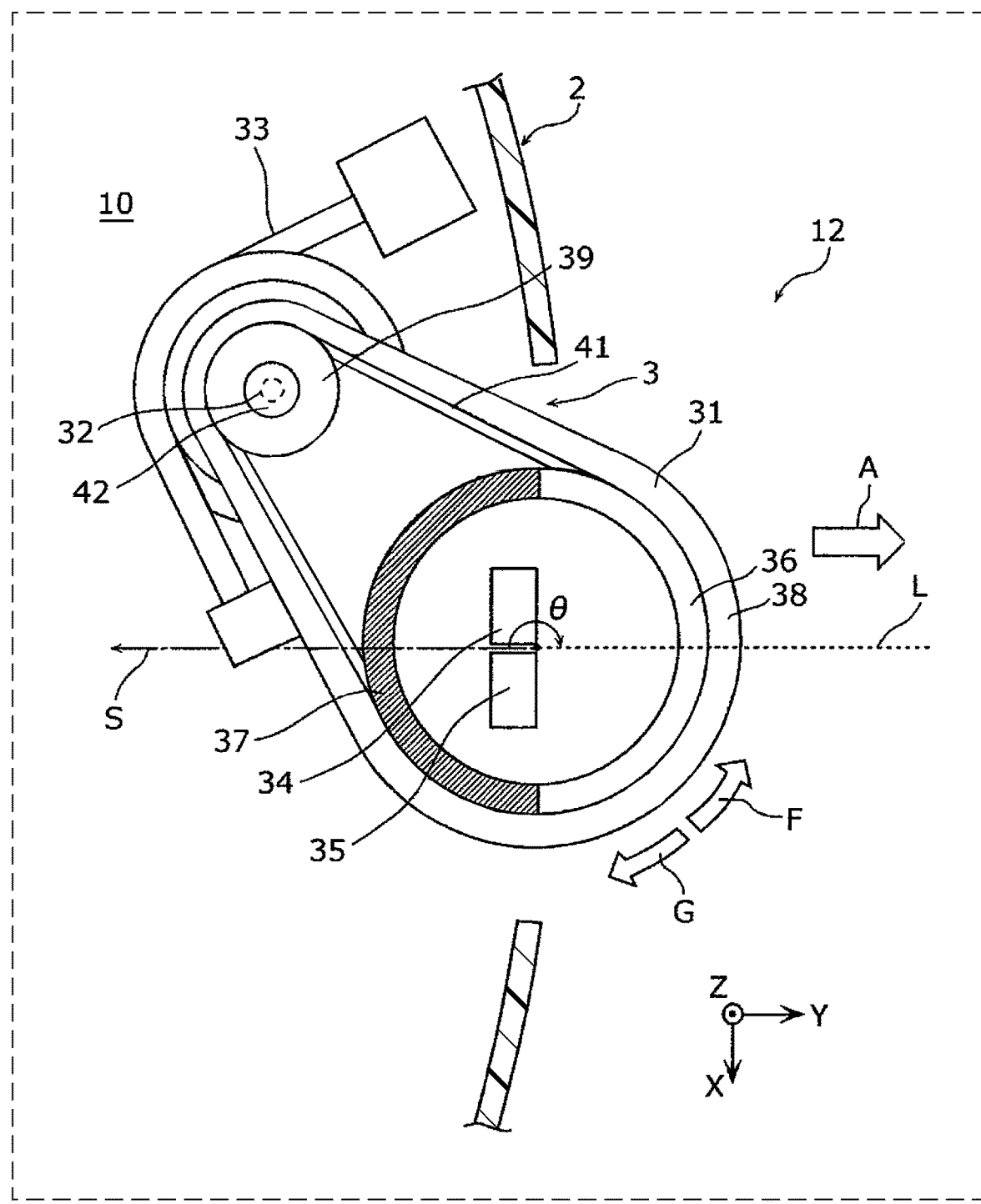
FIG. 7 is a schematic top view illustrating the structure of the distance measurer according to the embodiment in the normal state.
Figure 8:
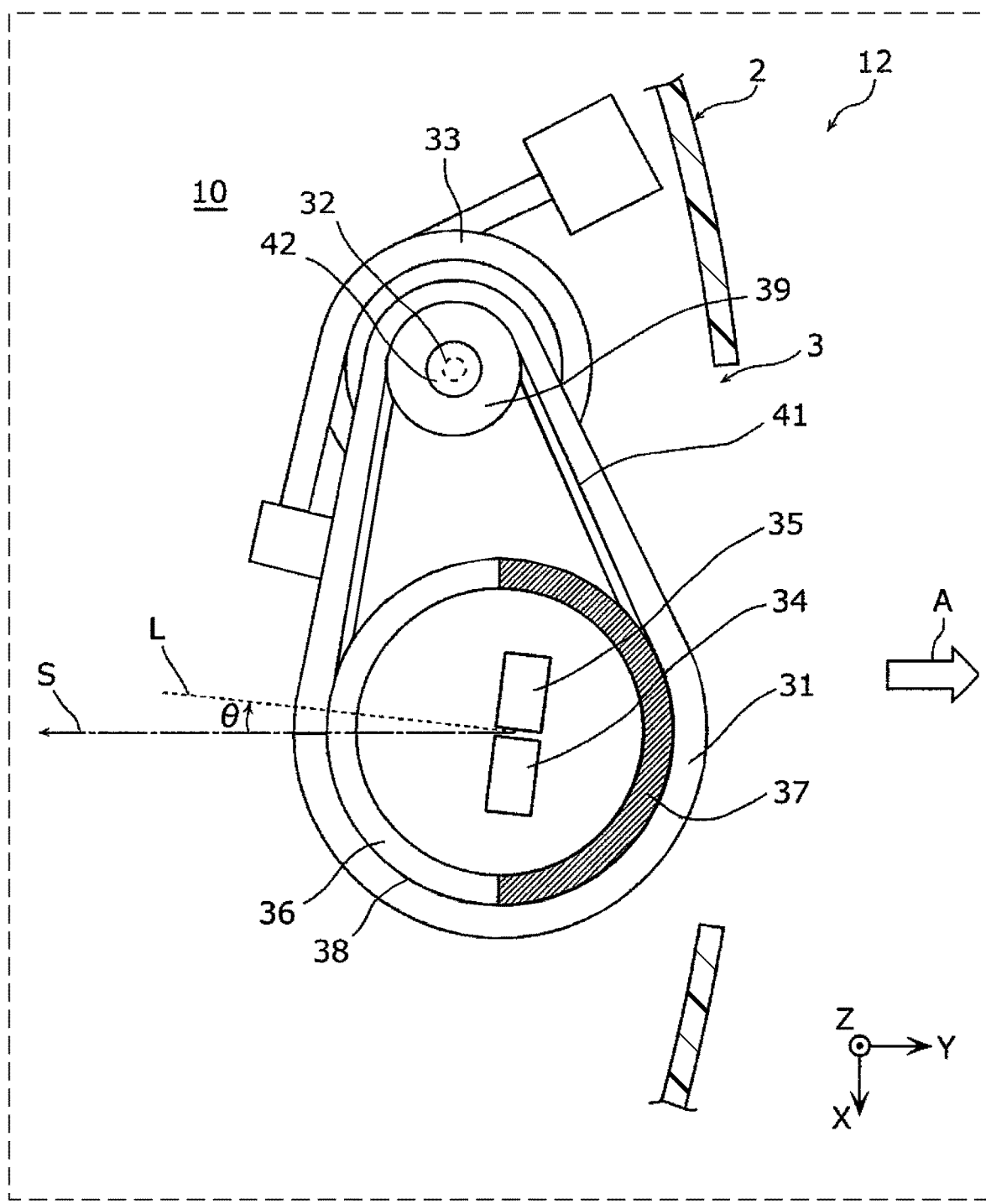
FIG. 8 is a schematic top view illustrating the structure of the distance measurer according to the embodiment in the retracted state.

FIG. 6 is a schematic side view illustrating the structure of the distance measurer 12 according to the present embodiment. FIGS. 7 and 8 are schematic top views illustrating the structure of the distance measurer 12 according to the present embodiment respectively in the normal state and in the retracted state.

As illustrated in FIGS. 6 to 8, the distance measurer 12 includes the base 31, a shaft 32, a spring 33, a light emitter 34, a light receiver 35, side surfaces 36 and 37, the turntable 38, a pulley 39, a motor 40, a magnet 42, and a Hall IC 43.

The base 31 is a table on which the light emitter 34 and the light receiver 35 are placed. The base 31 is connected to the body 10 via the spring 33. The base 31 is supported so as to be rotatable around the shaft 32 that is fixed to the body 10. As the base 31 rotates around the shaft 32, the distance measurer 12 can be switched to be in the normal state and to be in the retracted state. In a top view, the base 31 has a circular shape, an elliptical shape, or a teardrop shape. However, the shape of the base 31 is not limited to these.

To be more specific, the base 31 is movable to be in a first state in which the distance measurer 12 is located inside the body 10 and a second state in which the distance measurer 12 is located outside the body 10. In other words, the base 31 can selectively enter the first state and the second state.

An example of the first state is a state in which the side surface 36 (described below) is located in the space 11 inside the body 10. An example of the second state is a state in which the light emitter 53 emits light with an angular width of 180 degrees or more and in which a part of the body 10, that is, a part of the housing is not located at a position that is in the optical path of the light and that is between the light emitter 53 and an object in the cleaning space. For example, regarding the angle of light, in a top view, a direction perpendicular to the light-emitting surface of the light emitter 53 is defined as 0 degrees and a direction parallel to the light-emitting surface is defined as 90 degrees and −90 degrees. That is, the second state is a state in which a part of the body 10, that is, a part of the housing is not located from the direction perpendicular to the light-emitting surface of the light emitter 53 to the direction parallel to the light-emitting surface.

The first state is defined as, in a top view, a state in which 80% or more of the volume of the distance measurer 12 is contained inside the body 10, and the first state may be referred as "retracted state". The second state is defined as, in a top view, a state in which 60% or more of the volume of the distance measurer 12 is located outside the body 10, and the second state may be referred as "normal state".

The base 31 enters the normal state when an external object is not in contact with the base 31 or the distance measurer 12. The base 31 receives a force F that is an urging force of the spring 33. When an external object is not in contact with the distance measurer 12, in other words, only the force F is acting on the base 31, the base 31 is moved by the force F to a position where the base 31 contacts a restraining member (not shown), which is disposed at an appropriate position in the body 10, and stops at the position. FIG. 7 illustrates a state in which the base 31 has stopped in this way. The state illustrated in FIG. 7 is represented as "normal state of the distance measurer 12".

The base 31 enters the retracted state when an external object contacts the base 31 or the distance measurer 12. When an external object contacts the base 31 or the distance measurer 12, the base 31 is pushed by the external object, and thus a force G acts on the base 31 so as to move the base 31 into the body 10. As the cleaner 1 continues travelling, the base 31 moves further into the body 10, and finally almost the entirety of the base 31 becomes retracted in the body 10. FIG. 8 illustrates the state in which the base 31 is retracted in this way, which is represented as "the distance measurer 12 is in the retracted state". An example of the external object is the charger 5.

The spring 33 is a torsion coil spring and generates a force that pushes the base 31 from the front surface 2 of the body 10 to the outside of the body 10.

The light emitter 34 is a light source that emits light that is used by the distance measurer 12 to measure a distance. In the figures, the optical path of emitted light is illustrated as a light path L. The light emitter 34 emits light to the outside of the distance measurer 12 via the side surface 36. Laser light can be used as light emitted from the light emitter 34.

The light receiver 35 is a sensor that receives reflected light of light emitted by the light emitter 34. The light receiver 35 receives light that enters the light receiver 35 from the outside of the distance measurer 12 via the side surface 36. The reflected light received by the light receiver 35 is light emitted by the light emitter 34, reflected by an object near the cleaner 1, and travelled along the light path L.

In FIGS. 6 to 8, for convenience of description, the light emitter 34 and the light receiver 35 are arranged in the direction along the XY-plane. However, the arrangement of the light emitter 34 and the light receiver 35 is not limited to this. Although illustration is omitted, the distance measurer 12 includes an optical system that causes light emitted by the light emitter 34 to travel along the light path L and that causes the reflected light to travel along the light path L to the light receiver 35.

The side surface 36 is disposed so as to surround the light emitter 34 and the light receiver 35. The side surface 36 is, for example, a light-transmissive cover member that transmits light emitted by the light emitter 34 and that transmits reflected light of the light. The material of the side surface 36 is a light-transmissive material, to be more specific, for example, an acrylic resin, glass, or the like. The side surface 36 may be referred as "first side surface".

The side surface 37 is disposed so as to surround the light emitter 34 and the light receiver 35. The side surface 37 is, for example, a light-transmissive cover member. The side surface 37 may be referred as "second side surface".

The turntable 38 is placed on the base 31, and is supported so as to be rotatable relative to the base 31 around the Z-axis with a central part of the base 31 in a top view as the rotation center. The turntable 38 rotates at a velocity of, for example, 5 rotations per second. On the turntable 38, the light emitter 34, the light receiver 35, and the side surfaces 36 and 37 are placed.

The control circuit 19 controls the rotation of the turntable 38. To be specific, the control circuit 19 rotates the turntable 38 when the base 31 is in the normal state and stops rotating the turntable 38 when the base 31 is in the retracted state. Moreover, when the base 31 is in the retracted state, the control circuit 19 obtains the rotation angle of the turntable 38 from the Hall IC 43, and stops the rotation of the turntable 38 at a position where the side surface 37 can be seen from the opening 3 of the front surface 2.

The pulley 39 rotates the turntable 38. The pulley 39 is mechanically connected to the turntable 38 via a belt 41. The pulley 39 is rotated by the motor 40 around the shaft 32, which extends through the center of the pulley 39 in a top view, and rotates the turntable 38 by transmitting the rotation to the turntable 38 via the belt 41. The material of the belt 41 is a flexible and non-extensible material, which is specifically as a rubber or the like.

The motor 40 operates under the control by the control circuit 19 and rotates the pulley 39.

Figure 9:
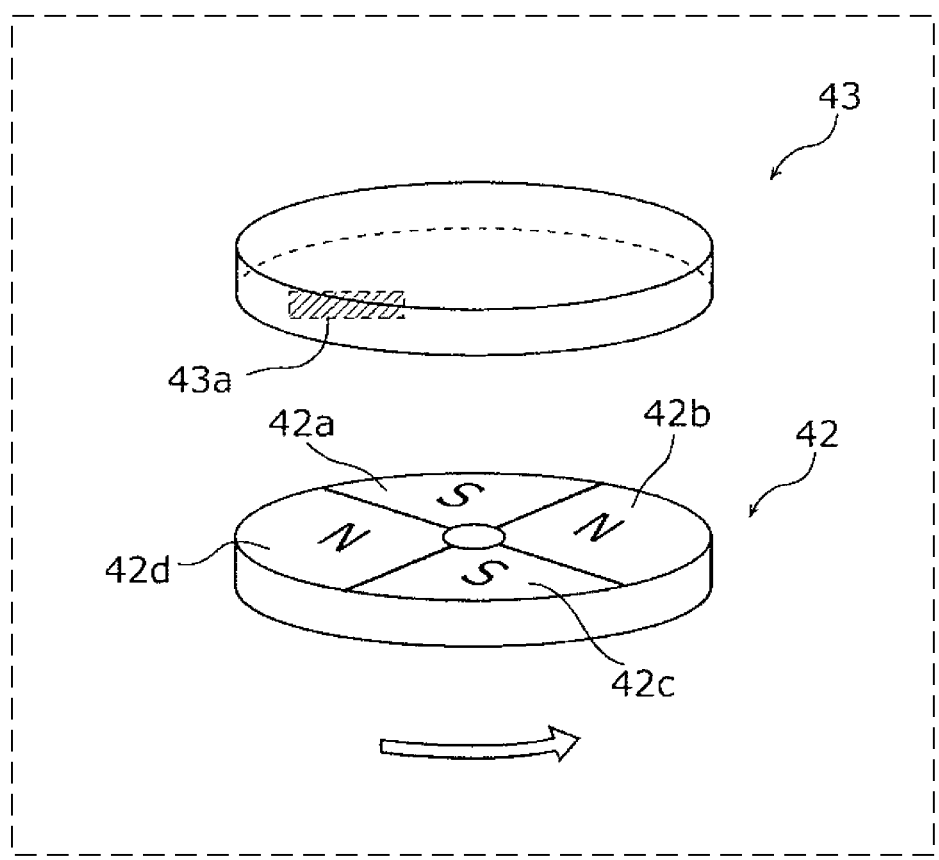
FIG. 9 is a schematic perspective view illustrating the structure of a detector according to the embodiment.

The magnet 42 and the Hall IC 43 constitute a detector that detects the orientation of the distance measurer 12 based the rotation angle of the pulley 39. Referring to FIG. 9, the structure of the detector will be described.

FIG. 9 is a schematic view illustrating the structure of the detector that detects the orientation of the distance measurer 12 according to the present embodiment. Here, the orientation of the distance measurer 12 is represented by, for example, the orientation of the light path L.

The magnet 42 generates a magnetic field around the magnet 42. The magnet 42 is fixed to an upper part of the pulley 39, and rotates around the shaft 32 together with the pulley 39. In a top view, the magnet 42 has a circular shape and is partitioned into four regions 42a, 42b, 42c, and 42d by four lines that radially extend from the center. The four regions 42a to 42d each have an N or S polarity and are arranged so that adjacent regions have different polarities. When the magnet 42 rotates together with the pulley 39, the magnet 42 generates a magnetic field whose polarity changes in order such as N, S, N, and S around the magnet 42.

The Hall IC 43 detects the magnetic field generated by the magnet 42. The Hall IC 43 detects the magnetic field, whose polarity changes in order such as N, S, N, and S due to the rotation of the magnet 42, by using a Hall element 43a, and outputs information representing the intensity of the detected magnetic field to the control circuit 19. The control circuit 19 obtains the rotation angle of the turntable 38 by using the polarity of the magnetic field obtained from the Hall IC 43. As the rotation angle of the turntable 38, for example, the angle θ between a reference direction S and the light path L illustrated in FIGS. 7 and 8 may be used. Here, the reference direction S is the direction opposite to the direction A. Thus, the Hall IC 43 functions as a sensor that detects the rotation angle of the turntable 38.

Processes performed by the cleaner 1, which is structured as described above, will be described.

Figure 10:
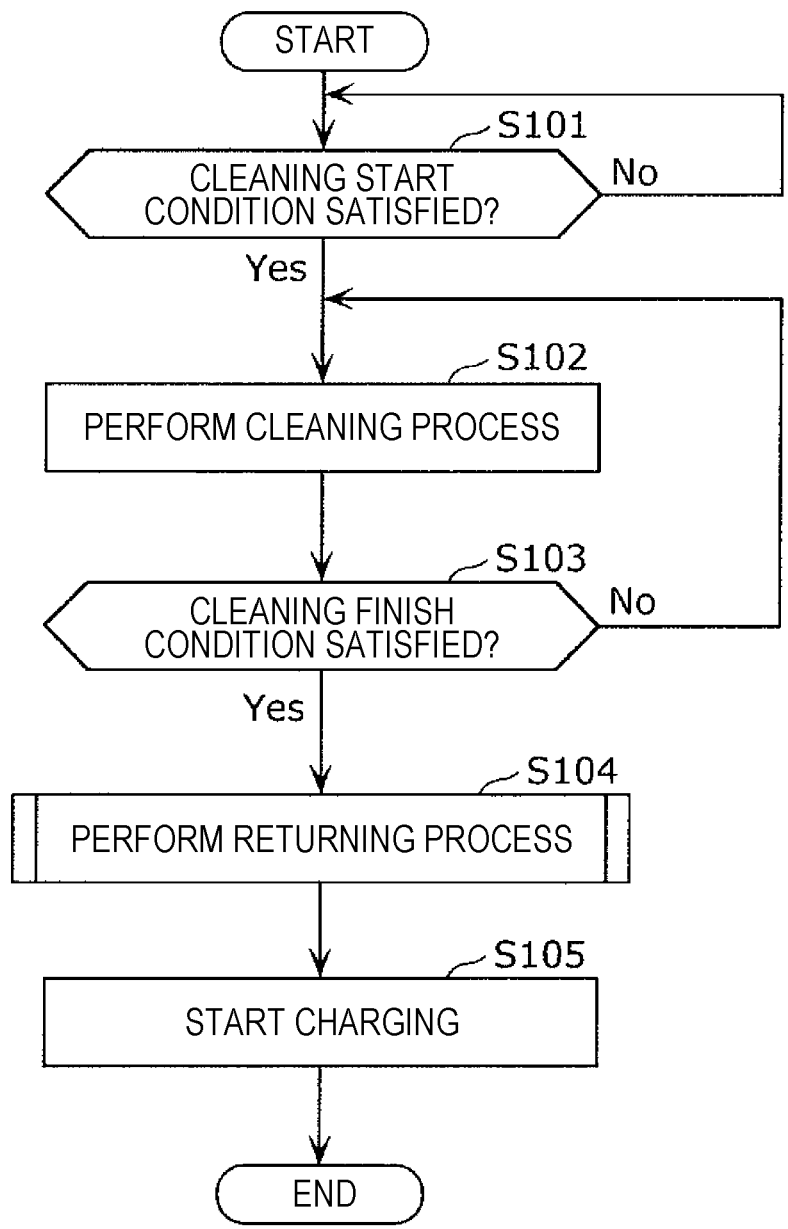
FIG. 10 is a flowchart of a method of controlling a cleaner according to an embodiment.

FIG. 10 is a flowchart of a method of controlling the cleaner 1 according to the present embodiment. FIG. 10 illustrates a process through which the cleaner 1 connected to the charger 5 separates from the charger 5, performs cleaning, and becomes connected to the charger 5 again.

In step S101, the control circuit 19 determines whether a condition for staring cleaning, that is, a cleaning start condition is satisfied. The cleaning start condition is, for example, whether a time set by a user as a time for starting cleaning has arrived, whether an operation by a user for starting cleaning has been performed, or the like. If it is determined in step S101 that the cleaning start condition is satisfied ("Yes" in step S101), the process proceeds to step S102. If not ("No" in step S101), step S101 is performed again. That is, the control circuit 19 waits until the cleaning start condition is satisfied.

In step S102, the cleaner 1 performs a cleaning process. In the cleaning process, the control circuit 19 measures the distance from the cleaner 1 to a nearby object by rotating the light emitter 34 and the light receiver 35 of the distance measurer 12, and determines the travel path of the cleaner 1. The control circuit 19 causes the cleaner 1 to travel along the determined travel path by using the motors 16a and 16b and the wheels 15a and 15b while sucking up dust by using the suction unit 17.

In step S103, the control circuit 19 determines whether a condition for finishing cleaning, that is, a cleaning finish condition is satisfied. The cleaning finish condition is, for example, whether cleaning of the cleaning surface 9 has finished, whether a user has performed an operation for finishing cleaning, whether the amount of charge of the power source 20 has decreased to a predetermined amount or smaller, or the like. If it is determined in step S103 that the cleaning finish condition is satisfied ("Yes" in step S103), the process proceeds to step S104. If not ("No" in step S103), step S102 is performed again. That is, the control circuit 19 continues the cleaning process until the cleaning finish condition is satisfied.

In step S104, the cleaner 1 performs a returning process. The details of returning process will be described below.

In step S105, charging of the cleaner 1 is started. At this time, the control circuit 19 controls the power source control circuit 20a to charge the main part of the power source 20 with electric power received from the charger 5 through the terminals 14.

In this way, the cleaner 1, which has been connected to the charger 5, separates from the charger 5, performs cleaning, and becomes connected to the charger 5 again.

Hereafter, the returning process will be described in detail.

Figure 11:
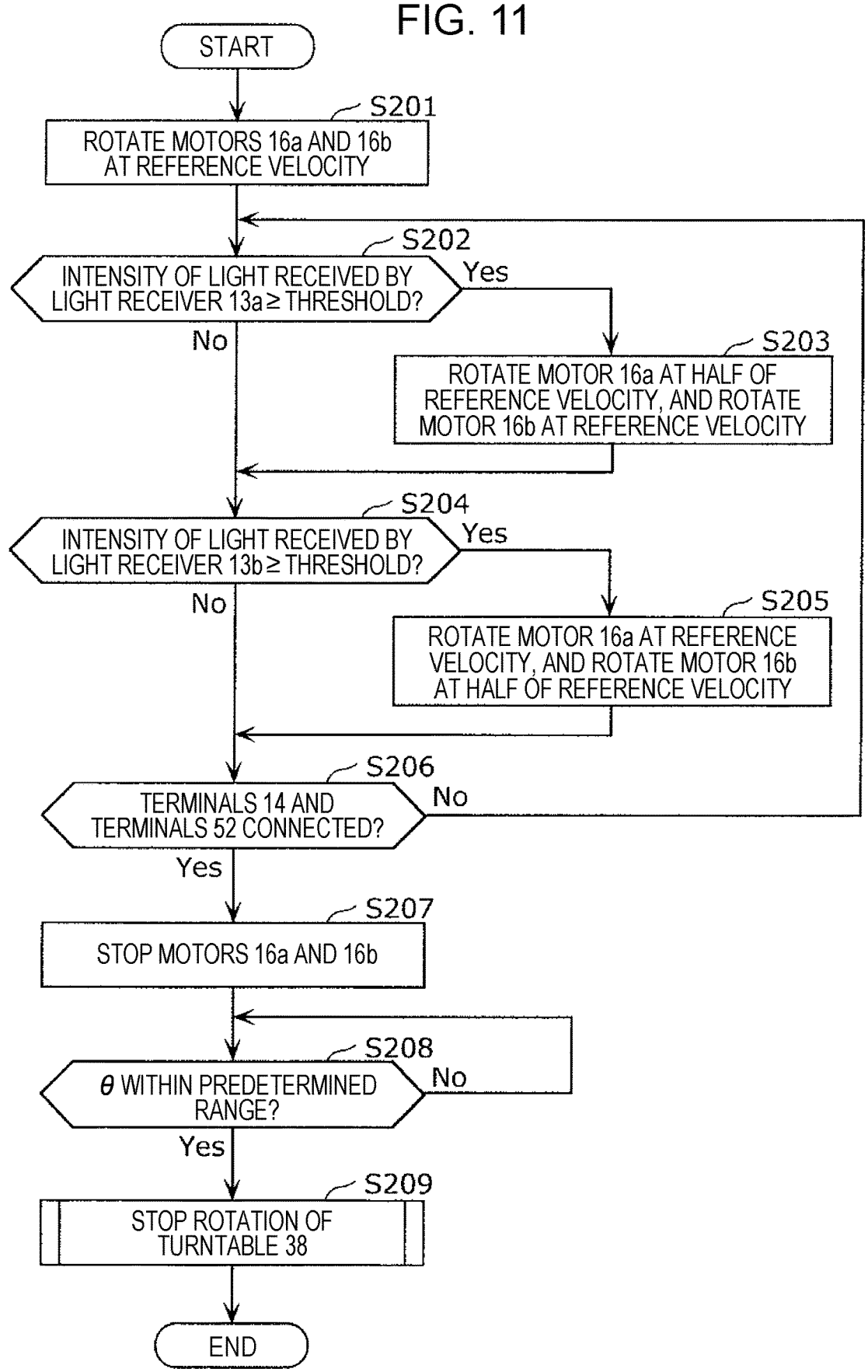
FIG. 11 is a flowchart of the details of a returning process according to the embodiment.

FIG. 11 is a flowchart of the details of the returning process according to the present embodiment. At the time of "START" in FIG. 11, the cleaner 1 has finished the cleaning process and is about to start the returning process. At this time, the distance measurer 12 is rotated by the turntable 38. The distance measurer 12 continues rotating until the rotation will be stopped in step S209 (described below).

In step S201, the control circuit 19 drives the wheels 15a and 15b for a predetermined time by using the motors 16a and 16b so that the cleaner 1 travels at a predetermined velocity. At this time, the rotation velocities of the motors 16a and 16b are the same rotation velocity, which will be referred to as "reference velocity". The predetermined time is, for example, 0.1 seconds, and the same applies hereafter. The predetermined velocity is, for example, 30 cm/s, but is not limited to this. The reference velocity can be calculated by using the predetermined velocity of the cleaner 1, the diameters of the wheels 15a and 15b, and the like.

In step S202, the control circuit 19 determines whether the intensity of infrared light received by the light receiver 13a is a threshold or higher. If it is determined that the intensity is the threshold or higher ("Yes" in step S202), the process proceeds to step S203. If not ("No" in step S202), the process proceeds to step S204. The threshold is, for example, about 70% or higher of the maximum value of the intensity of infrared light received by the light receiver 13a. In a case where the light receiver 13 outputs whether light is received or not, the threshold may be 100%.

In step S203, the control circuit 19 drives the wheels 15a and 15b for a predetermined time by rotating the motor 16a at a velocity that is a half of the reference velocity and by rotating the motor 16b at the reference velocity. Thus, the travelling direction of the cleaner 1 is changed leftward by a slight angle. Instead of a half of the reference velocity, any appropriate velocity lower than the reference velocity may be used. The same applies hereafter.

In step S204, the control circuit 19 determines whether the intensity of infrared light received by the light receiver 13b is a threshold or higher. If it is determined that the intensity is the threshold or higher ("Yes" in step S204), the process proceeds to step S205. If not ("No" in step S204), the process proceeds to step S206. The threshold of the intensity of light received by the light receiver 13b is the same as the threshold of the intensity of light received by the light receiver 13a.

In step S205, the control circuit 19 drives the wheels 15a and 15b for a predetermined time by rotating the motor 16a at a reference velocity and by rotating the motor 16b at a half of the reference velocity. Thus, the travelling direction of the cleaner 1 changes rightward by a slight angle.

In step S206, the control circuit 19 determines whether the terminals 14 are connected to the terminals 52. This determination is made, for example, based on determination by the power source control circuit 20a as to whether electric power is suppled through the terminals 14. If it is determined that the terminals 14 are connected to the terminals 52 ("Yes" in step S206), the process proceeds to step S207. If not ("No" in step S206), step S202 is performed.

In step S207, the control circuit 19 stops driving the motors 16a and 16b. Thus, the cleaner 1 stops moving.

In step S208, the control circuit 19 obtains the angle θ shown in FIG. 7 as information representing the rotation angle of the turntable 38, and determines whether the angle θ is within a predetermined range. Here, the predetermined range is a range of the angle θ such that the side surface 37 is exposed to the outside from the opening 3, in other words, a range of the angle θ such that the side surface 36 is not exposed to the outside from the opening 3. If the angle θ is within the predetermined range ("Yes" in step S208), the process proceeds to step S209. If not ("No" in step S208), step S208 is performed again. When step S208 is performed again, the rotation angle of the turntable 38 has changed compared with the time step S208 was performed, and therefore the angle θ may be within the predetermined range.

In step S209, the control circuit 19 stops the rotation of the turntable 38 by stopping the rotation of the motor 40.

Through the processes described above, the cleaner 1, which has been in a charging state, performs cleaning, and enters the charging state again.

First Modification of Embodiment

Figure 12:
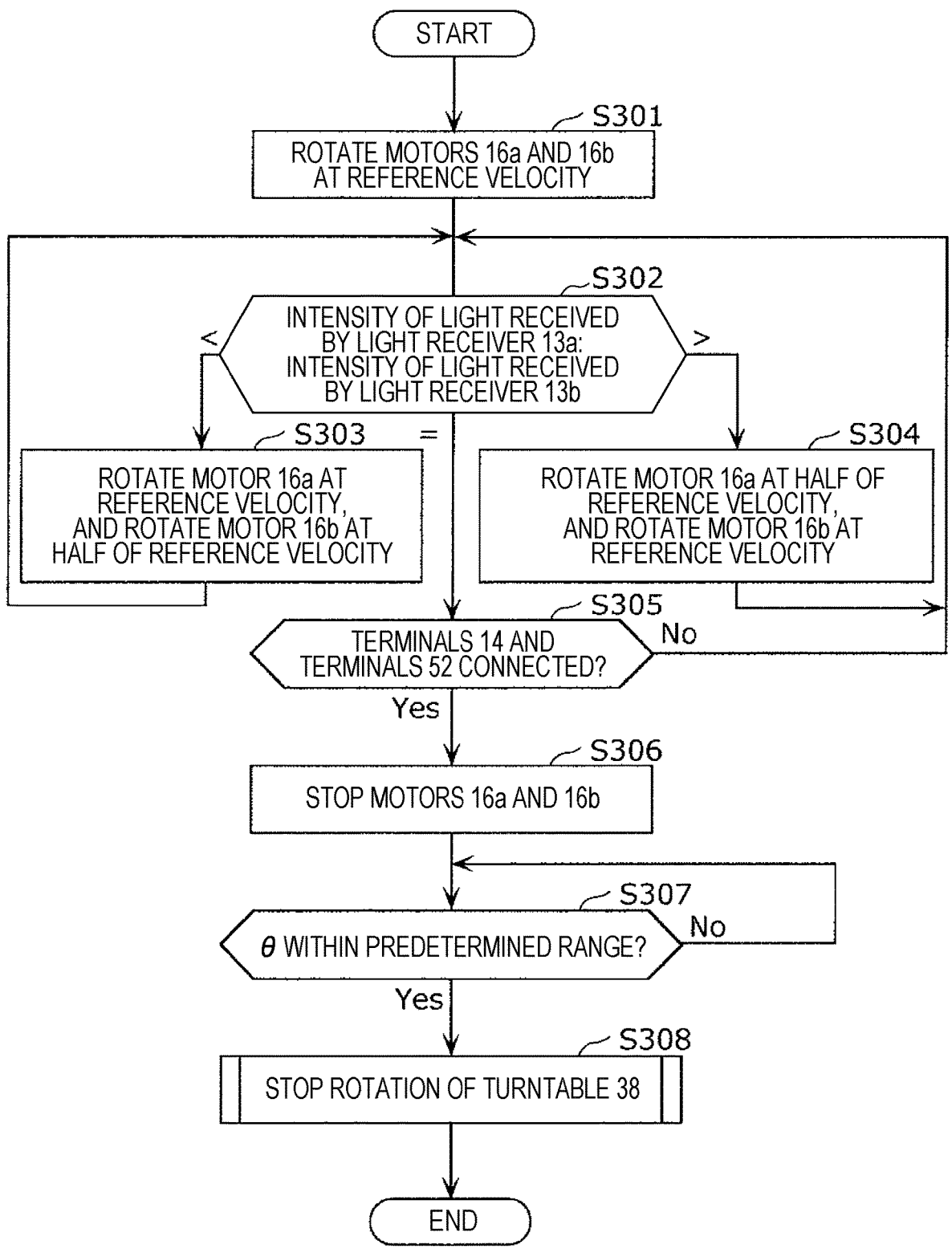
FIG. 12 is a flowchart of the details of a returning process according to a first modification of the embodiment.

In the present modification, an example of a returning process that is different from the returning process according to the embodiment will be described. FIG. 12 is a flowchart of the details of the returning process according to a first modification of the present embodiment.

In step S301, the control circuit 19 rotates the motors 16a and 16b at the reference velocity so that the cleaner 1 travels at a predetermined velocity.

In step S302, the control circuit 19 compares the intensity of infrared light received by the light receiver 13a with the intensity of infrared light received by the light receiver 13b. If the intensity of infrared light received by the light receiver 13b is higher ("<" in step S302), the process proceeds to step S303. If the intensity of infrared light received by the light receiver 13a is higher (">" in step S302), the process proceeds to step S304. If the intensities are the same ("=" in step S302), the process proceeds to step S305.

In step S303, the control circuit 19 drives the wheels 15a and 15b for a predetermined time by rotating the motor 16a at the reference velocity and rotating the motor 16b at a half of the reference velocity. Thus, the travelling direction of the cleaner 1 changes rightward by a slight angle.

In step S304, the control circuit 19 drives the wheels 15a and 15b for a predetermined time by rotating the motor 16a at a half of the reference velocity and rotating the motor 16b at the reference velocity. Thus, the travelling direction of the cleaner 1 changes leftward by a slight angle.

In step S305, the control circuit 19 determines whether the terminals 14 are connected to the terminals 52. This determination is the same as the determination in step S206 of the embodiment. If it is determined that the terminals 14 are connected to the terminals 52 ("Yes" in step S305), the process proceeds to step S306. If not ("No" in step S305), step S302 is performed.

Descriptions of steps S306 to S308, which are respectively the same as steps S207 to S209 of the embodiment, will be omitted.

Second Modification of Embodiment

In the present modification, a cleaner 1A that differs in external shape from the cleaner 1 according to the embodiment will be described.

Figure 13:
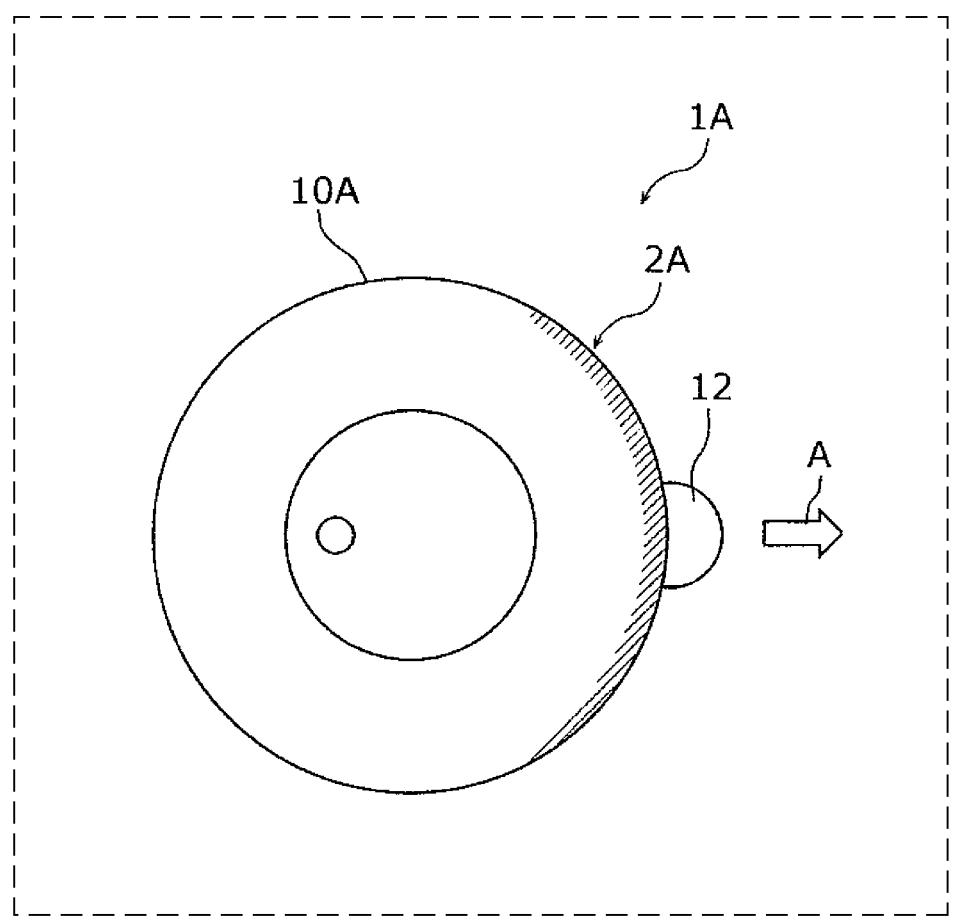
FIG. 13 is a schematic external top view of a cleaner according to a second modification of the embodiment.

FIG. 13 a schematic external top view of the cleaner 1A according to the present modification.

As illustrated in FIG. 13, the cleaner 1A includes a body 10A.

The body 10A forms the outline of the cleaner 1A. The body 10A has a circular shape in a top view. A part of the outer surface of the body 10A that faces in the travelling direction indicated by an arrow A will be referred to as "front surface 2A".

The cleaner 1A is the same as the cleaner 1 according to the embodiment except that the body 10A has a circular shape.

The cleaner 1A having such a shape can travel along a more appropriate travel path, in the same way as the cleaner 1 according to the embodiment does.

As described above, the mobile robot, which is the cleaner according to any of the embodiment and the modifications, can obtain the distance to a nearby object by using the laser range finder that is disposed on the base that is pushed out from the front surface of the body by the spring in the second state. Because the laser range finder is pushed out from the front surface of the body, the mobile robot can obtain not only the distance to an object that is present in the forward direction but also the distance to an object that is present in a wider area in the left-right direction. Then, the mobile robot can determine a more appropriate travel path by using the distance to a nearby object that is obtained in this way. Because the laser range finder is located inside the body in the first state, when the mobile robot does not obtain the distance to a nearby object, it is possible to reduce the probability that the laser range finder becomes soiled or damaged due to, for example, contact with a nearby object. As a result, when the mobile robot enters the second state the next time, the mobile robot can more appropriately obtain the distance to a nearby object. Moreover, because the mobile robot has the laser range finder at the front surface, it is possible to avoid increase in the height of the mobile robot and to reduce difficulty in traveling under a piece of furniture such as a sofa, which may occur if the laser range finder is disposed at the upper surface. Thus, the mobile robot can travel along a more appropriate travel path.

The base of the mobile robot enters the first state or the second state depending on whether an external object contacts the base. Thus, the mobile robot can change the state of the base on the basis of more specific structure, and, as a result, the mobile robot can travel along a more appropriate travel path.

The base of the mobile robot enters the first state when the base contacts the charger, which is an example of an external object, and is charged. Thus, the mobile robot can reduce the probability that the laser range finder becomes soiled or damaged due to, for example, contact with the charger when the mobile robot is being charged.

The mobile robot stops the rotation of the laser range finder in the first state. Thus, when the mobile robot does not obtain the distance to a nearby object, it is possible to further reduce the probability that the laser range finder becomes soiled or damaged due to, for example, contact with a nearby object.

The mobile robot stops the rotation of the turntable in an orientation such that a surface of the laser range finder that is not used to emit light faces the opening in the front surface. Thus, when the mobile robot does not obtain the distance to a nearby object, it is possible to further reduce the probability that a surface of the laser range finder that is used to emit light becomes soiled or damaged due to, for example, contact with a nearby object.

In each of the embodiments described above, each of the elements may be implemented in a dedicated hardware or may be implemented by executing a software program that is suitable for each of the elements. Each of the elements may be implemented by a program executing unit, such as a CPU or a processor, that executes a software program stored in a storage medium such as a hard disk or a semiconductor memory.

Heretofore, mobile robots and the like according to one or more aspects have been described based on embodiments. However, the present disclosure is not limited to these embodiments. Within the gist of the present disclosure, various modifications of the embodiments that are conceivable by a person having ordinary skill in the art and an embodiment that is constructed by using combinations of elements of different embodiments may be included in the scope of one or more aspects.

INDUSTRIAL APPLICABILITY

The present disclosure is applicable to a cleaner that can autonomously travel along a more appropriate travel path.

What is claimed is:

1. A mobile robot that autonomously travels, the mobile robot comprising:
a body that has a front surface;
a driver that is disposed in the body and that drives travelling of the body;
a base that includes a spring and that is connected to the body via the spring; and
a shaft; and
a laser range finder that is disposed at an upper part of the base,
wherein the base is configured to be movable around the shaft to allow the base to switch between a first state in which the laser range finder is located inside the body and a second state in which the laser range finder is located outside the body,
wherein the spring generates a force that pushes the base from a front surface of the body to an outside of the body,
wherein the mobile robot further includes a control circuit,
wherein the laser range finder includes
a turntable,
a light emitter disposed on the turntable,
a light receiver disposed on the turntable,
a first side surface that is disposed on the turntable so as to surround the light emitter and the light receiver, and
a second side surface that is disposed on the turntable so as to surround the light emitter and the light receiver,
wherein the light emitter emits light to an outside of the laser range finder via the first side surface,
wherein the light receiver receives light that enters the light receiver from the outside of the laser range finder via the first side surface,
wherein the control circuit
stops rotation of the turntable around an axis in the first state, and
rotates the turntable around the axis in the second state, and
wherein the axis is parallel to the shaft.

2. The mobile robot according to claim 1,
wherein the body has an opening in the front surface,
wherein the laser range finder further includes a sensor that detects a rotation angle of the turntable, and
wherein the control circuit
(a) obtains the rotation angle of the turntable from the sensor in the first state, and
(b) stops the rotation of the turntable at a position where the second side surface is visible from the opening.

3. The mobile robot according to claim 1,
wherein the base enters the first state when an external object contacts the base or the laser range finder, and
wherein the base enters the second state when the external object is not in contact with the base or the laser range finder.

4. The mobile robot according to claim 1,
wherein the shaft is perpendicular to travel directions of the mobile robot.

5. A mobile robot that autonomously travels, the mobile robot comprising:
a shaft perpendicular to travel directions of the mobile robot;
a body that has a front surface;
a driver that is disposed in the body and that drives travelling of the body;
a base that includes a spring and that is connected to the body via the spring; and
a laser range finder that is disposed at an upper part of the base, wherein the base is configured to be movable around the shaft to allow the base to switch between a first state in which the laser range finder is located inside the body and a second state in which the laser range finder is located outside the body, wherein the spring generates a force that pushes the base from a front surface of the body to an outside of the body, wherein the mobile robot further includes a power source control circuit and a power source, wherein an external object is a charger, and wherein the power source control circuit charges the power source by using the charger when the base is in the first state.

6. The mobile robot according to claim 5, wherein the base enters the first state when the external object contacts the base or the laser range finder, and wherein the base enters the second state when the external object is not in contact with the base or the laser range finder.

7. A method of controlling a mobile robot that autonomously travels, the mobile robot including a body that has a front surface, a driver that is disposed in the body and that drives travelling of the body, a base that includes a spring and that is connected to the body via the spring, a shaft, a laser range finder that is disposed at an upper part of the base, and a control circuit, wherein the spring generates a force that pushes the base from a front surface of the body to an outside of the body, wherein the laser range finder includes a turntable, a light emitter disposed on the turntable, a light receiver disposed on the turntable, a first side surface that is disposed on the turntable so as to surround the light emitter and the light receiver, and a second side surface that is disposed on the turntable so as to surround the light emitter and the light receiver, and wherein the base is configured to be movable around the shaft to allow the base to switch between a first state in which the laser range finder is located inside the body and a second state in which the laser range finder is located outside the body, the method comprising:

emitting, by the light emitter, light to an outside of the laser range finder via the first side surface;

receiving, by the light receiver, light that enters the light receiver from the outside of the laser range finder via the first side surface;

stopping, by the control circuit, rotation of the turntable around an axis in the first state; and rotating, by the control circuit, the turntable around the axis in the second state, wherein the axis is parallel to the shaft.

8. The method according to claim 7, wherein the body has an opening in the front surface, wherein the laser range finder further includes a sensor that detects a rotation angle of the turntable, and wherein the method further comprises:

obtaining the rotation angle of the turntable from the sensor in the first state, and stopping the rotation of the turntable at a position where the second side surface is visible from the opening.

9. The mobile robot according to claim 7, wherein the shaft is perpendicular to travel directions of the mobile robot.

10. A method of controlling a mobile robot that autonomously travels, the mobile robot including a shaft perpendicular to travel directions of the mobile robot, a body that has a front surface, a driver that is disposed in the body and that drives travelling of the body, a base that includes a spring and that is connected to the body via the spring, a laser range finder that is disposed at an upper part of the base, a power source control circuit, and a power source, wherein the spring generates a force that pushes the base from a front surface of the body to an outside of the body, wherein the base is configured to be movable around the shaft to allow the base to switch between a first state in which the laser range finder is located inside the body and a second state in which the laser range finder is located outside the body, and wherein an external object is a charger, the method comprising:

charging, by the power source control circuit, the power source by using the charger when the base is in the first state.

* * * * *